Oct. 27, 1959
H. K. GLEASMAN
2,910,157
TWO SPEED GEAR DRIVE AND HUB BRAKE FOR VELOCIPEDES AND THE LIKE
Filed April 3, 1958
2 Sheets-Sheet 1
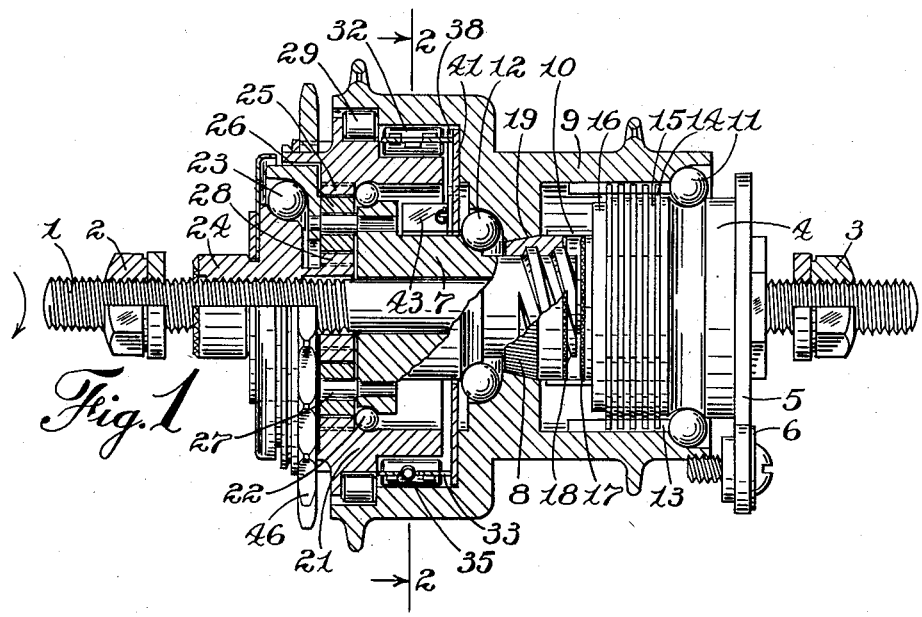
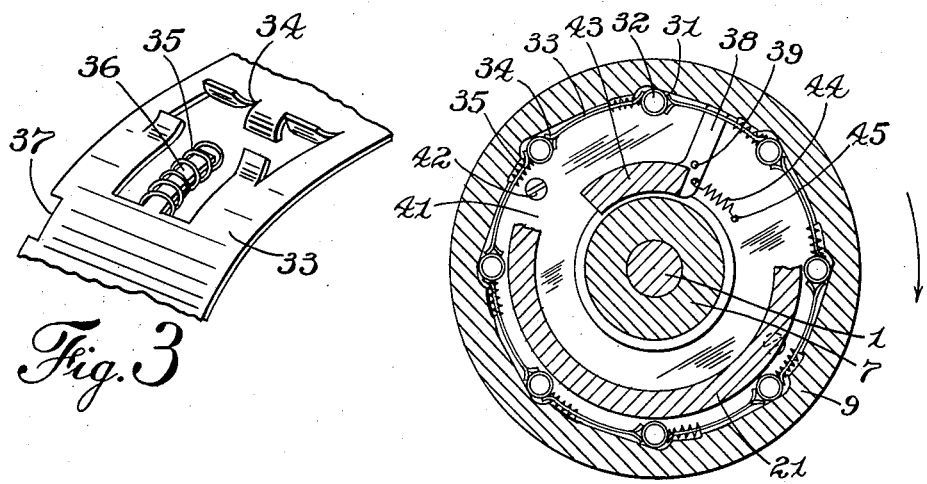
INVENTOR.
Hollis K. Gleasman
BY
ATTORNEY
WITNESS:
Esther M. Stockton

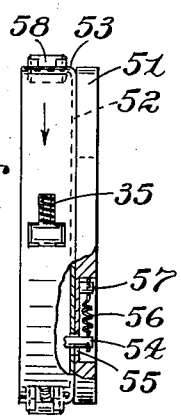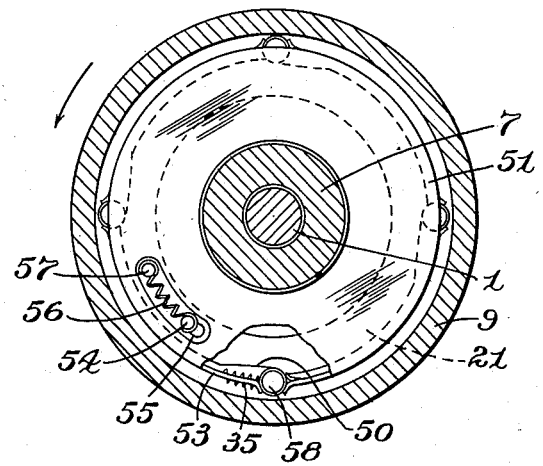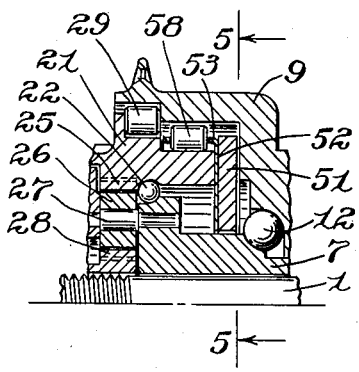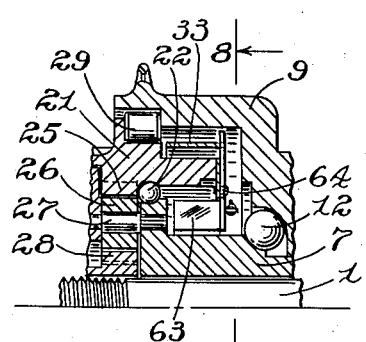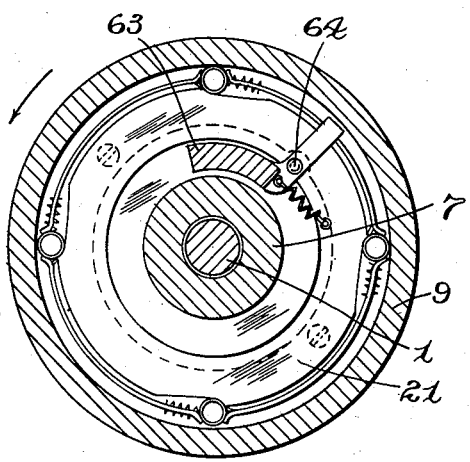

United States Patent Office 2,910,157
Patented Oct. 27, 1959

2,910,157

TWO SPEED GEAR DRIVE AND HUB BRAKE FOR VELOCIPEDES AND THE LIKE

Hollis K. Gleasman, Elmira, N.Y., assignor to Bendix Aviation Corporation, Elmira Heights, N.Y., a corporation of Delaware Application April 3, 1958, Serial No. 726,283

7 Claims. (Cl. 192—6)

The present invention relates to a two speed gear drive and hub brake for velocipedes and the like, and more particularly to an automatic variable speed transmission of this type.

It is an object of the present invention to provide a novel automatic variable speed hub drive and brake which is efficient and reliable in operation and simple and economical in construction.

It is another object to provide such a device which is completely self-contained, requiring no external controlling means.

It is another object to provide such a device in which the shift from low gear to high gear is controlled by one or more weight members movably mounted in the hub, while the shift from high gear to low gear is directly under the control of the operator.

It is another object of the invention to provide such a device which is retained in high gear as long as the operator continues to propel the vehicle, but may shift back to low gear if the operator momentarily interrupts his forward pedaling movement. Further objects and advantages will be apparent from the following description taken in connection with the accompanying drawings.

Fig. 1 is a substantially mid-sectional view of a preferred embodiment of the invention showing the parts in the positions assumed during operation in low gear;

Fig. 2 is a section taken substantially on the line 2—2 of Fig. 1;

Fig. 3 is an enlarged detail in perspective of a portion of the cage controlling the high speed clutch rollers;

Fig. 4 is a detail in axial section showing a second embodiment of the high speed clutch controlling mechanism;

Fig. 5 is a vertical section taken substantially on the line 5—5 of Fig. 4;

Fig. 6 is a side view of the structure shown in Fig. 5, partly broken away and in section to show the operative connection for the roller cage;

Fig. 7 is a view similar to Fig. 4 of a third embodiment of the invention, and

Fig. 8 is a section taken substantially on the line 8—8 of Fig. 7.

In Fig. 1 of the drawing there is illustrated a stationary axle 1 which is adapted to be clamped in the rear fork of the frame of a vehicle, not illustrated, as by means of clamp nuts 2 and 3. A brake anchor member 4 is fixedly mounted on the axle 1 and prevented from rotation by means of an anchor arm 5 having a clip 6 for attachment to the frame of the vehicle.

A low speed screw shaft and planet carrier member 7 is rotatably mounted on the axle 1 and has a clutch nut and brake applying member 8 threaded thereon. A hub member 9 is rotatably mounted on the anchor member 4 by means of bearings 11 and on screw shaft 7 by means of bearings 12. The inner surface of the hub member 9 is formed with splines 13, and a plurality of brake discs 14 are slidably mounted on said splines and arranged for frictional engagement with intercalated brake discs 15 similarly splined on the anchor member 4. A pressure plate 16, also splined on the anchor member 4, is provided with teeth 17 adapted to be engaged by similar teeth 18 on the clutch nut 8, whereby backward rotation of the screw shaft 7 will cause the clutch nut to engage the pressure plate and compress the brake discs to frictionally retard rotation of the hub 9.

Forward rotation of the screw shaft 7 causes the clutch nut 8 to engage a tapered interior surface 19 in the hub 9 to transmit rotation thereto. Traversal of the nut 8 is ensured by an elastic frictional drag member 10 fixed on the pressure plate 16 and bearing on said nut.

A driving member 21 is rotatably mounted on the low speed screw shaft and planet carrier 7 as by means of bearings 22, and is supported at its outer end by means of a bearing 23 on a stationary cone member 24 fixed on the axle 1. The interior of the driving member 21 is provided with teeth forming an orbit gear 25, and a plurality of planet pinions 26 are rotatably mounted on gudgeons 27 fixedly mounted on the end of the planet carrier and screw shaft 7. The planets 26 mesh with a sun gear 28 which is attached to or may be formed integral with the cone member 24.

A bearing 29 is provided for supporting the end of hub 9 on the driving member 21, this bearing being preferably a roller bearing in order to permit adjustment of bearings 11, 12, 22 and 23 by adjustment of the cone member 24 on the axle.

High speed clutch means are provided for connecting the driving member 21 directly to the hub 9 responsive to speed and/or acceleration of the hub. For this purpose the interior surface of the hub adjacent the bearings 29 is formed with a plurality of circumferentially tapered recesses 31, as shown in Fig. 2, in which a series of clutch rollers 32 are seated. The adjacent surface of the driving member 21 is formed as a smooth cylinder whereby the rollers 32, in moving toward the shallower ends of the recesses are wedged against the driving member to thereby frictionally transmit its rotation to the hub.

An annular cage member 33 is provided for maintaining the clutch rollers 32 in equally spaced relation for this purpose. Said cage is formed with seats 34 for receiving the rollers as best shown in Fig. 3, and springs 35 located on prongs 36 normally maintain the rollers against said seats as shown in Fig. 2.

The cage 33 is formed with a notch 37 on one side, and a radially extending lever 38 engages at its outer end in said notch. Lever 38 is pivoted at 39 on a circular plate 41 attached to the hub as by means of screws 42. A weight member 43 is mounted on the inner end of lever 38 with its center of gravity nearer the axis of the hub than the pivot 39, located rearwardly of said pivot in respect to the direction of forward rotation of the hub. Acceleration of the hub will consequently tend to rotate the lever 38 in clockwise direction around pivot 39 as viewed in Fig. 2, and centrifugal force responsive to the rotation of the hub will have a like effect. This clockwise rotation of the lever 38 being transmitted by the outer end of the lever to the cage 33 by means of its engagement in the notch 37, will cause the cage to move the rollers 32 toward the shallow ends of the recesses 31, and thereby cause engagement of the clutch. A spring 44 anchored at 45 to the plate 41 normally holds the cage 33 in such position as to locate the rollers in the deeper ends of the recesses 31 and out of contact with the driving member 21 as shown in Fig. 2.

In operation, starting with the parts in the positions illustrated in Fig. 1, rotation of the driving member 21, as by means of a sprocket 46 fixed thereon, in the direction of the arrow will cause rotation of the low speed screw shaft 7 in the same direction through the planetary reduction gearing 25, 26 and 28, whereby the clutch nut 8 is traversed to the left in Fig. 1 into engagement with the hub 9 to rotate it at a reduced speed. When the rotation of the hub reaches a predetermined speed, the centrifugal force exerted by the weight member 43, assisted by the effect of acceleration, becomes effective to overcome the spring 44 and rotate the cage 33 in the direction to engage the clutch rollers 32 between the wedging surfaces of the hub and driving member. The high speed clutch is therefore caused to rotate the hub 9 at the speed of the driving member 21, and the engagement of the high speed clutch will be maintained as long as the operator continues to propel the driving member.

When the operator stops pedaling, if the rotation of the hub is below a predetermined speed, the spring 44 will move the cage 33 to return the rollers to their inoperative position. It will be understood that a plurality of levers 38 and weight members 43 may be provided. Preferably an even number is used in order to balance their static effect on the cage 33.

In Figs. 4, 5, and 6 of the drawings, there is illustrated a second embodiment of the invention in which the control of the high speed clutch is responsive to acceleration of the driving member 21.

As best seen in Figs. 4 and 5, the driving member 21 is in this case formed with tapered clutch recesses 50, and the interior surface of the hub is smooth. A weight member in the form of a ring 51 is mounted on a flange 52 formed on the clutch roller cage 53. A pin 54 fixedly mounted in the driving member 21 extends through an arcuate slot 55 in the weight member 51 and flange 52, and a spring 56 attached to the pin 54 and anchored to the ring 51 at 57, normally holds the ring and cage in position to hold the clutch rollers 58 disengaged from the hub as shown in Fig. 5. The remaining parts of the device are the same as illustrated in Fig. 1, so further illustration is deemed unnecessary.

In the operation of this embodiment of the invention, acceleration of the driving member 21 by the operator will cause the weighted ring 51 to lag behind, thus overcoming the spring 56, and causing the cage 53 to move the rollers 58 into clutching position. This may be brought about at any time desired by the operator by merely back pedaling slightly and then pedaling forward briskly, after which the high speed drive will be maintained as long as the operator pedals forward continuously.

In Figs. 7 and 8 of the drawings, a further embodiment of the invention is illustrated, in which the engagement of the high speed clutch is controlled by either acceleration or centrifugal force or both. For this purpose, one or more weight members 63 similar to that illustrated in Fig. 2 of the drawings are employed but these weight members instead of being pivoted to the hub as in the first embodiment of the invention are pivoted on the driving member as shown at 64 in Fig. 7.

The operation of this embodiment of the invention, so far as centrifugal control is concerned, is similar to the embodiment of Fig. 1 except that the shift to high speed will take place at a lower rotational speed in view of the fact that when in low gear, the driving member is rotating faster than the hub. In addition to this effect, acceleration of the driving member as described in connection with the second embodiment of the invention will also actuate the high speed clutch by reason of the tendency of the weight member 63 to lag behind the pivot 64 as the driving member is accelerated.

Although certain structure has been shown and described in detail, it will be understood that other embodiments are possible, and changes may be made in the design and arrangement of parts without departing from the spirit of the invention.

I claim:

1. In a two-speed gear drive and hub brake for velocipedes and the like, a stationary axle, a brake anchor member fixedly mounted thereon, a low speed screw shaft rotatably mounted on the axle, a driving member rotatably mounted on the screw-shaft, reduction gearing connecting the driving member to the screw shaft, a hub rotatably mounted on the driving member and the anchor member, braking means for frictionally connecting the hub to the anchor member, a clutch nut threaded on the screw shaft movable by forward rotation of the screw shaft to engage and drive the hub, and by backward movement of the screw shaft to engage and actuate the braking means, high speed clutch means for connecting the driving member directly to the hub, a weight member mounted in the hub with freedom for relative movement responsive to rotation of the hub, and means energized by movement of said weight member responsive to a predetermined forward acceleration of the hub for actuating said high speed clutch.

2. A device as set forth in claim 1 in which said high speed clutch comprises a plurality of rollers movable into and out of wedging engagement between the driving member and the hub, a rotatably mounted cage maintaining said clutch rollers in equally spaced relation, spring means urging said cage in the direction to release the rollers, and means actuated by said weight member to move the cage to cause engagement of the rollers.

3. A device as set forth in claim 2, in which the interior of the hub is formed with tapered recesses receiving the clutch rollers, and the weight member is pivoted on the interior of the hub with freedom for movement away from the axis of the hub responsive to centrifugal force, and a lever actuated by radial movement of said weight member to rotate the cage in the direction to move the clutch rollers toward the shallow ends of said tapered recesses.

4. A device as set forth in claim 2 in which said cage is formed with seats for the clutch rollers which hold the rollers out of frictional engagement with the relatively movable clutch element, and includes springs urging the rollers toward said seats.

5. A device as set forth in claim 2 in which the outer surface of the driving member is formed with tapered recesses receiving the clutch rollers, and the weight member is movably mounted on the driving member.

6. A device as set forth in claim 5 in which the weight member is in the form of a ring mounted on the driving member for limited relative rotation, and rigidly connected to the clutch roller cage.

7. A device as set forth in claim 6 in which the cage is formed with seats adapted to hold the clutch rollers out of engagement with the hub, and including springs urging the rollers toward said seats.

References Cited in the file of this patent

UNITED STATES PATENTS 2,555,152  Pullin et al. _____ May 29, 1951
2,796,775  Gleasman _____ June 25, 1957